United States Patent [19]

McInerney

[11] 4,120,156

[45] Oct. 17, 1978

[54] TURBOCHARGER CONTROL

[75] Inventor: Charles E. McInerney, Rolling Hills Estates, Calif.

[73] Assignee: The Garrett Corporation, Los Angeles, Calif.

[21] Appl. No.: 804,687

[22] Filed: Jun. 8, 1977

[51] Int. Cl.² .............................................. F02D 23/00
[52] U.S. Cl. ........................................ 60/602; 415/144
[58] Field of Search ................ 60/600, 602, 605, 598; 415/28, 144, 145; 417/407

[56] References Cited

U.S. PATENT DOCUMENTS

| 1,090,110 | 3/1914 | Thomsen | 415/144 X |
| 1,310,682 | 7/1919 | Sherbondy | 60/602 |
| 1,923,251 | 8/1933 | Bauer et al. | 415/145 |
| 3,233,403 | 2/1966 | MacInnes et al. | 60/600 |
| 4,005,579 | 2/1977 | Lloyd | 60/602 |

FOREIGN PATENT DOCUMENTS

| 43,563 | 12/1971 | Japan | 415/28 |
| 960,110 | 6/1964 | United Kingdom | 60/605 |

Primary Examiner—Carlton R. Croyle
Assistant Examiner—Michael Koczo, Jr.
Attorney, Agent, or Firm—Stuart O. Lowry; Albert J. Miller

[57] ABSTRACT

A turbocharger having an exhaust gas driven turbine for driving a compressor which supplies high pressure charge air to an internal combustion engine. A turbine wheel rotates within a turbine housing having a gas inlet and a gas outlet for circulation of exhaust gases to drive the turbine. The exhaust gases exit through a gas discharge housing mounted on the turbine housing and including a bypass chamber communicating with the gas inlet. A turbine bypass valve on the discharge housing is controllably actuated to seat on the turbine housing to close the bypass chamber.

20 Claims, 9 Drawing Figures

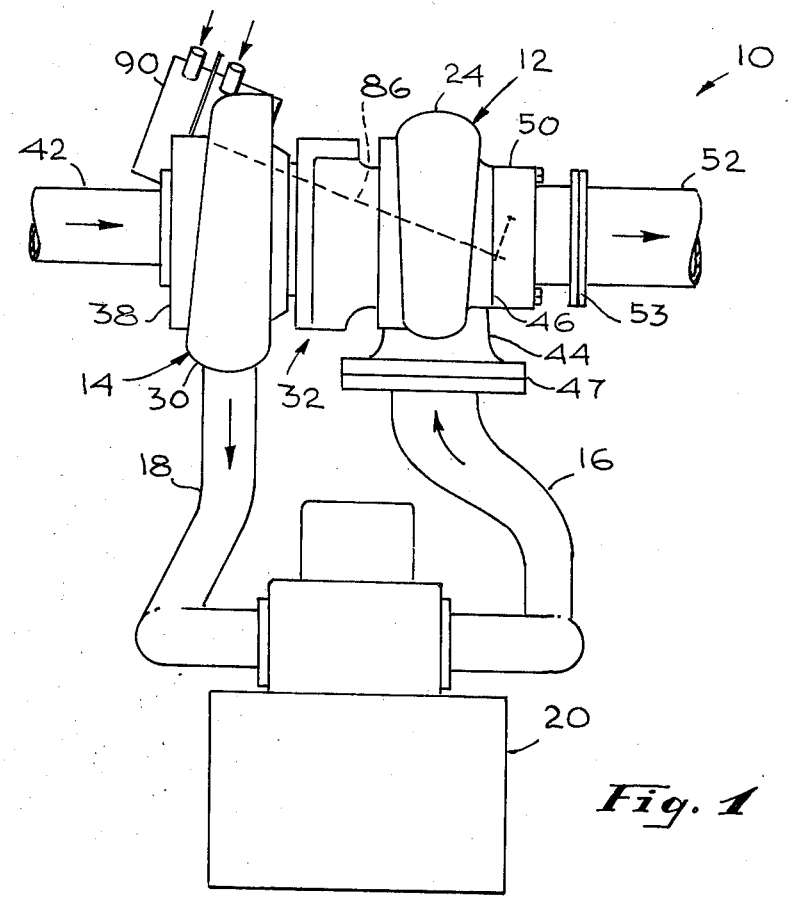
Fig. 1
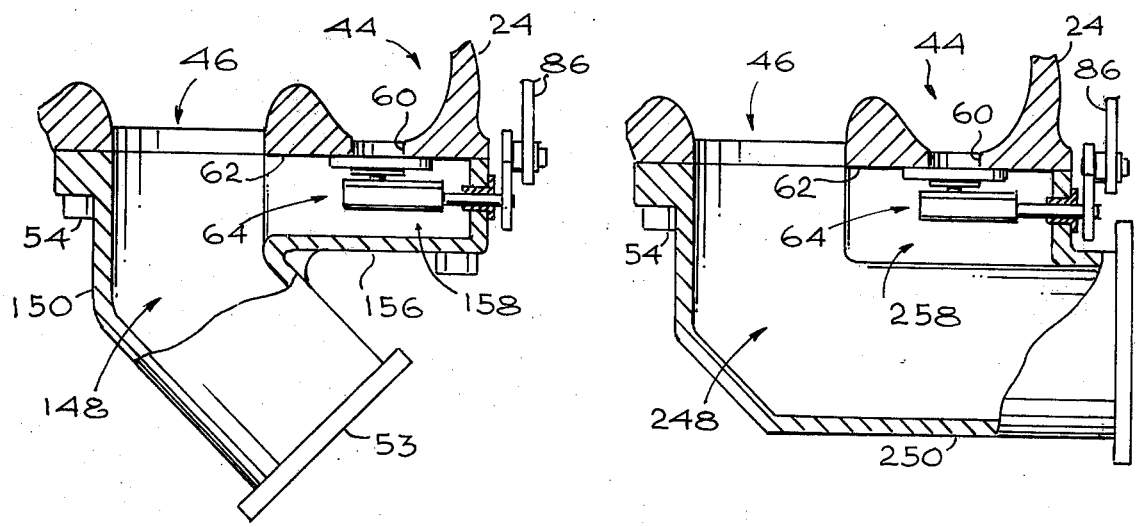
Fig. 8
Fig. 9

TURBOCHARGER CONTROL

BACKGROUND OF THE INVENTION

This invention relates to turbochargers for supplying relatively high pressure charge air to an internal combustion engine. More specifically, this invention relates to a turbocharger control including means for controllably preventing the delivery to an engine of charge air above a predetermined pressure level, and for maintaining the charge air substantially at that predetermined level.

Turbochargers are well known in the prior art, and typically comprise a turbine wheel and a compressor wheel mounted on a common shaft and carried within isolated turbine and compressor housings. The turbine housing includes a gas inlet and a gas outlet, and is coupled to the engine exhaust gas manifold for circulation of the exhaust gases through the turbine housing to rotatably drive the turbine wheel. In turn, the turbine wheel rotatably drives the compressor wheel which compresses wheel ambient air and supplies the compressed air to the intake manifold of the engine. Importantly, the gas outlet of the turbocharger housing is typically coupled to an exhaust gas discharge housing which is in turn coupled to exhaust system conduits which may include pollution and noise control equipment.

The use of turbochargers is highly advantageous when compared with conventional naturally aspirated engines in that substantially higher density fuel-air mixtures may be delivered to the engine cylinders. This increased fuel-air density results in substantially improved engine performance and efficiency. However, with many internal combustion engines, it is desirable to limit the maximum pressure at which charge air may be delivered to the engine, and to maintain the delivery of charge air at that maximum pressure level. That is, many turbochargers are capable of delivering charge air to the engine at pressures substantially greater than the engine or the turbocharger can withstand. Accordingly, a wide variety of valves and other pressure control devices have been proposed to limit the maximum discharge pressure, or boost, of the turbocharger compressor.

Turbocharger boost controls typically comprise valved apparatus, commonly referred to as a waste gate valve, for bypassing a portion of the engine exhaust gases around the turbine wheel. In this manner, a portion of the exhaust gases is prevented from driving the turbine wheel so that the turbine wheel rotates at less than maximum speed whereby the compressor wheel is also driven at less than maximum speed. Structurally, some of these bypass devices comprise a bypass passage integrally cast as part of the turbine housing and a bypass or waste gate valve mounted directly on the turbine housing. See, for example, U.S. Pat. Nos. 3,195,805; 3,196,606; 4,005,578; and 4,005,579. These bypass devices are disadvantageous, however, in that they require relatively complicated and expensive turbine housing castings together with relatively expensive metering valves machined to close manufacturing tolerances. Other bypass devices have been proposed which remove the bypass passage and the valve from the turbine housing. See, for example, U.S. Pat. Nos. 3,035,408; 3,096,614; 3,104,520; and 3,389,553. However, these devices all require separate specially constructed and relatively complicated bypass conduit constructions mounted on the turbine housing, and do not eliminate the need for expensive metering valves.

The present invention overcomes the problems and disadvantages of the prior art by providing a turbocharger with boost control wherein the turbine housing casting is simplified, and wherein separate bypass conduit constructions and close valve tolerances are eliminated.

SUMMARY OF THE INVENTION

In accordance with the invention, a turbocharger is provided having a turbine wheel and a compressor wheel mounted on a common shaft and carried within separate turbine and compressor housings, respectively. The turbine housing is adapted for coupling to the exhaust gas manifold of an internal combustion engine, and includes a gas inlet and a gas outlet for the circulation of engine exhaust gases into and through the turbine housing to drivingly rotate the turbine wheel. The turbine wheel in turn drives the compressor wheel which supplies compressed charge air to the intake manifold of the engine.

An exhaust gas discharge housing is mounted on the turbine housing, and includes an exhaust discharge passage communicating with the exhaust gas outlet for directing the exhaust gases through exhaust system conduits for the engine which may include pollution and noise control equipment. The discharge housing also includes a bypass chamber communicating between the discharge passage and the turbine housing gas inlet via a bleed hole formed in the turbocharger housing. A turbine bypass valve is mounted on the discharge housing, and includes a valve head operatively situated to seat over the bleed hole to close communication between the turbine housing gas inlet and the exhaust gas discharge passage. Means are provided for controllably actuating the valve in accordance with predetermined engine operating conditions.

BRIEF DESCRIPTION OF THE DRAWINGS

The accompanying drawings illustrate the invention. In such drawings:

FIG. 1 is a schematic diagram of a controlled turbocharger of this invention coupled to an internal combustion engine;

FIG. 8 is a fragmented horizontal section similar to FIG. 6 showing an alternate embodiment of the invention; and FIG. 9 is a fragmented horizontal section similar to FIG. 5 showing another embodiment of the invention.

DETAILED DESCRIPTION OF THE PREFERRED EMBODIMENT

Figure 2:
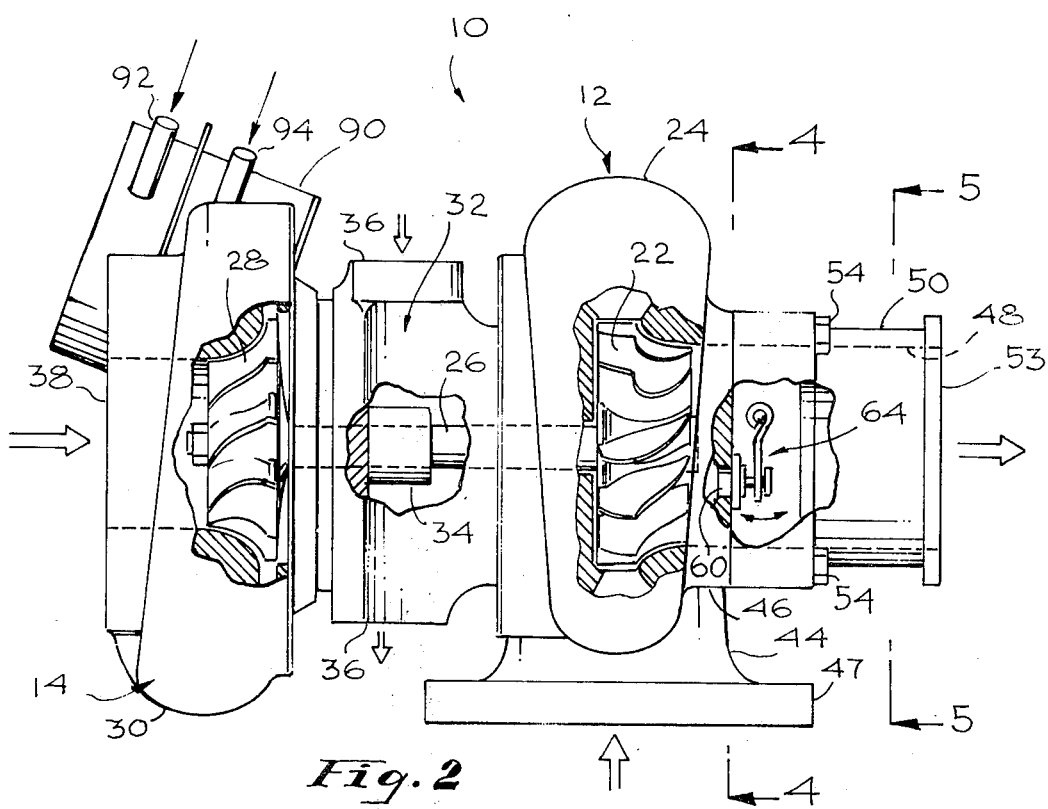
FIG. 2 is an enlarged side elevation view of the turbocharger, with portions broken away.
Figure 3:
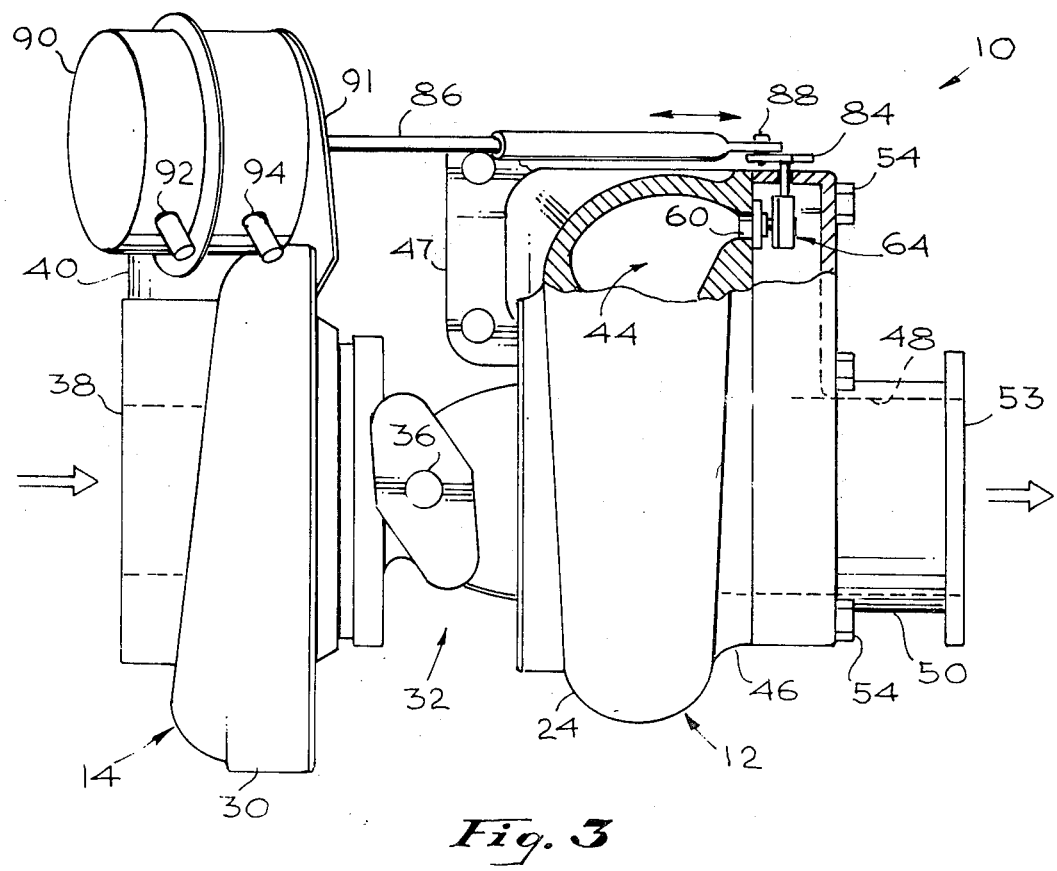
FIG. 3 is a top plan view of the turbocharger of FIG. 2, with portions broken away.

A turbocharger 10 is shown in FIGS. 1-3, and generally comprises a turbine 12 and a compressor 14 coupled to the exhaust gas manifold 16 and the air intake manifold 18, respectively, of an internal combustion engine 20. The turbine 12 comprises a turbine wheel 22 positioned within a generally scroll-shaped turbine housing 24, and mounted for simultaneous rotation on a common shaft 26 with a compressor wheel 28 carried within a compressor housing 30. The turbine housing 24 and the compressor having 30 are mounted on opposite ends of a center housing assembly 32 including bearings 34 for supporting the common shaft 26. Conveniently, oil ports 36 are provided in the center housing assembly 32 for facilitating lubrication of the bearings 34 and the shaft 26.

The compressor housing 30 includes an open air inlet 38 through which ambient air is drawn axially into the compressor housing 30 when the compressor wheel 28 is rotated. The rotating compressor wheel 28 serves to compress the air drawn into the housing, and to discharge the air through a compressor air outlet 40. In most internal combustion engines, the compressor air inlet 38 is connected downstream of the throttle (not shown) by a suitable conduit 42, and the compressor air outlet 40 is connected to the air intake manifold 18 of the engine 20. In this manner, the compressor 14 serves to supply the engine with charge air at elevated pressures.

The compressor wheel 28 is rotatably driven by the turbine wheel 22, which in turn is rotatably driven by exhaust gases discharged from the engine 20. More specifically, the turbine housing 24 includes an exhaust gas inlet 44 and an exhaust gas outlet 46, both in communication with the interior of the turbine housing 24. The exhaust gas inlet 44 is coupled as by suitable flanges 47 to the exhaust manifold 16 of the engine 20 whereby hot engine exhaust gases expelled from the engine pass through the turbine housing gas inlet 44 and impinge upon the blades of the turbine wheel 22 to rotatably drive said turbine wheel. The exhaust gases exit the turbine housing 24 in an axial direction through the exhaust gas outlet 46 for subsequent passage through a suitable exhaust gas system conduit 52 for the engine. Of course, the conduit 52 may include suitable pollution control and/or noise abatement equipment through which the exhaust gases are directed before being exhausted to the environment.

A discharge housing 50 provides means for connecting the turbine housing 24 with the exhaust system conduit 52. More specifically, the discharge housing 50 is connected to the turbine housing 24 by a series of bolts 54, and generally covers the exhaust gas outlet 46 of the turbine housing. The discharge housing 50 includes a discharge passage 48 aligned with the gas outlet 46 and the exhaust conduit 52 whereby the hot exhaust gases circulated through the turbine 12 are exhausted through the discharge housing 50 to the conduit 52. Conveniently, the discharge housing 50 and the conduit 52 include flanges 53 for interconnection in a suitable manner.

As shown in the drawings, the discharge housing 50 includes an open, generally shell-shaped portion 56 extending laterally from the discharge passage 48 in a direction generally toward the gas inlet 44 of the turbine housing 24. This shell-shaped portion 56 comprises a gas bypass chamber 58 openly communicating with the gas discharge passage 48 of the discharge housing 50, together with the gas inlet 44 of the turbine housing 24 via a bleed hole 60 formed in the turbine housing. That is, the bleed hole 60 is formed in the turbine housing 24 along the open gas inlet 44 of the housing prior to impingement of the exhaust gases upon the blades of the turbine wheel 22. In practice, the bleed hole 60 is preferably positioned along the turbine gas inlet 44 prior to any substantial narrowing of the inlet 44 for purposes of accelerating gas flow prior to driving the turbine wheel.

Figure 4:
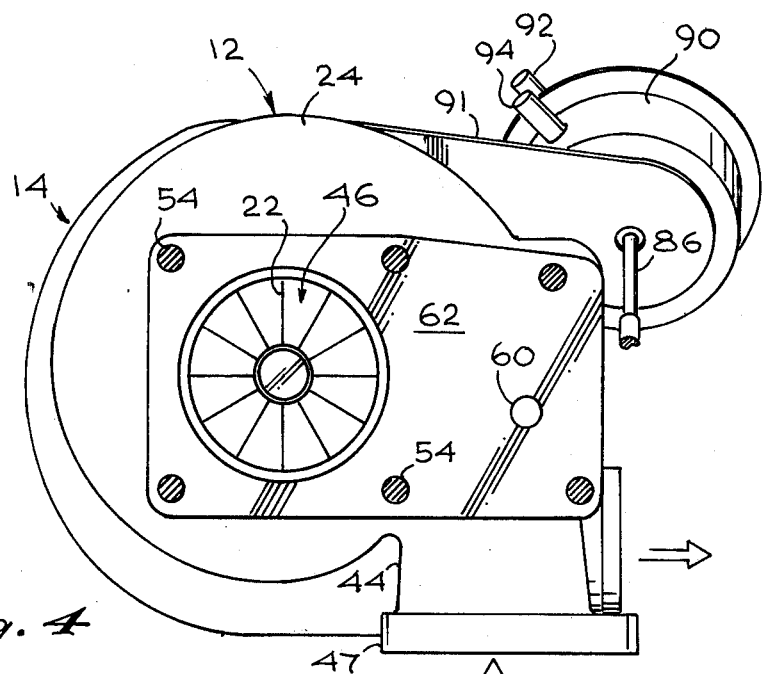
FIG. 4 is a vertical section taken on line 4—4 of FIG. 2.
Figure 5:
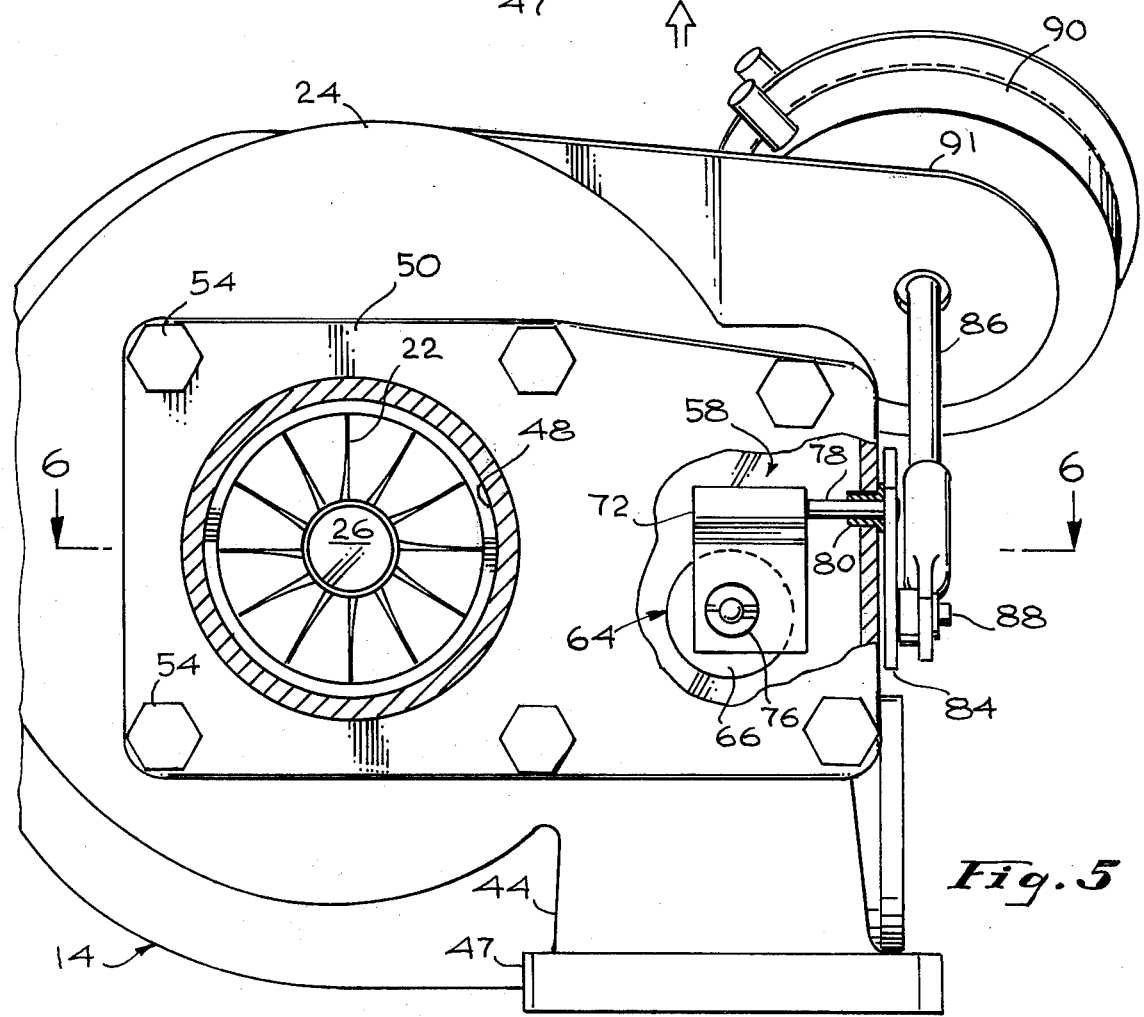
FIG. 5 is an enlarged end view taken on the line 5—5 of FIG. 2, with portions broken away.
Figure 6:
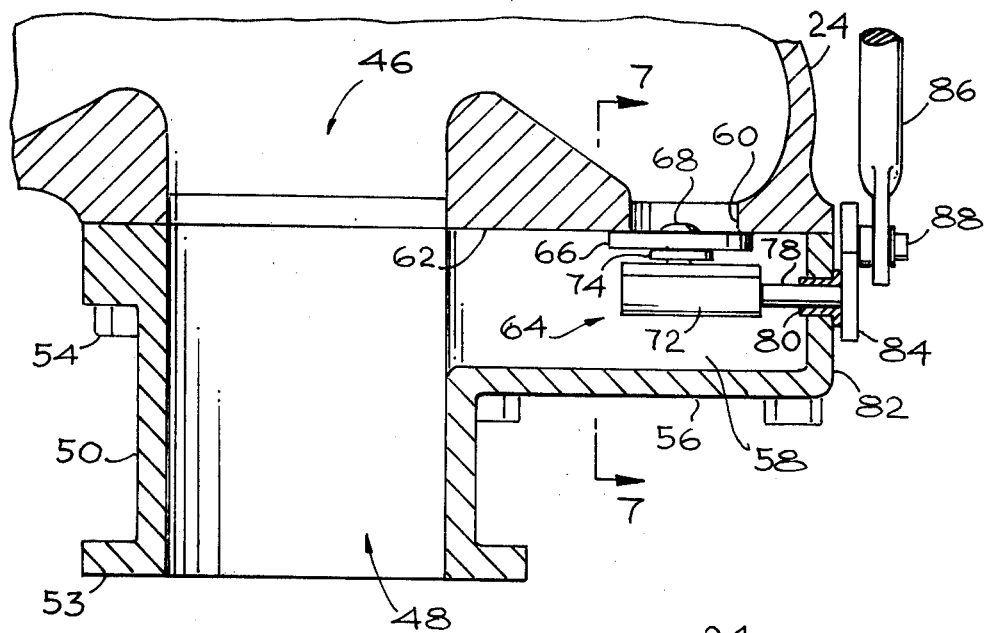
FIG. 6 is a fragmented horizontal section taken on the line 6—6 of FIG. 5.

As shown in FIGS. 4 and 6, the bleed hole 60 is formed through the turbine housing 24 generally alongside the gas outlet 46 and opening in a direction substantially parallel to the axis of the gas outlet 46. With this configuration, the turbine housing is cast with the gas outlet 46 and the bleed hole 60 formed in a common end wall 62. This provides a substantially simplified turbine housing casting in that the end wall 62 may be machined to a substantially planar surface as shown. The discharge housing 50 including the discharge passage 48 and the bypass chamber 58 is conveniently shaped for matingly engaging the planar end wall 62 of the turbine housing to cover both of the turbine housing openings. If desired, a suitably shaped gasket (not shown) may be interposed between the turbine housing 24 and the discharge housing 50 to provide a tight gas seal therebetween.

A turbine bypass valve 64 is provided for controllably opening and closing the bleed hole 60 to control the bypassing of exhaust gases around the turbine wheel 22. Specifically, the bypass valve 64 comprises a substantially flat circular-shaped valve head 66 having a diameter larger than the diameter of the bleed hole 60. The valve head 66 is secured by a rivet 68 to one end of a valve stem 70 extending rearwardly from the valve head 66 into the bypass chamber 58. A metal strip 72 is relatively loosely received over the stem 70 between a first washer 74 fixed on the stem 70 adjacent the valve head 66 and a second washer 76 fixed on the rear end of the valve stem. The metal strip 72 extends generally upwardly from the valve stem 66, and is wrapped around and fixed at its upper end as by welding to one end of a horizontally extending shaft 78. The shaft 78 is received outwardly through a bushing 80 carried in the side wall 82 of the discharge housing 50, and has its outwardly extending end secured to one end of a crank link 84. The crank link 84 extends downwardly from the shaft 78 and generally away from the discharge housing, and has its lowermost end pivotally connected to actuator rod 86 by a pin 88. The actuator rod 86 extends upwardly and away from the discharge housing 50, and is controllably coupled to a canister-shaped regulator 90.

The regulator 90 is mounted on the compressor housing 30 by a bracket 91, and provides means for controllably and automatically moving the actuator rod 86 to shift the position of the valve head 66 with respect to the bleed hole 60. The regulator 90 is conventional in construction, and typically includes an internal diaphragm (not shown) coupled to the actuator rod 86, and dividing the regulator into two separate chambers. See, for example, U.S. Pat. No. 3,195,805. A pair of hose fittings 92 and 94 are mounted on the regulator 90, and provide inlet passages into the two chambers on opposite sides of the diaphragm. Control is provided by coupling the fittings 92 and 94 to different sources of pressures to create a pressure differential on opposite sides of the diaphragm which varies in accordance with engine operating conditions. In this manner, the actuator rod 86 is shifted in response to changes in predetermined engine operating conditions according to the specific sources of pressure coupled to the fittings 92 and 94. For example, in some applications, it is desirable to couple the hose fittings 92 and 94 to compressor discharge pressure and ambient pressure, respectively. In other applications, it may be desirable to couple the fittings 92 and 94 to compressor discharge pressure and inlet pressure, respectively. Alternately, other types of regulators may be used for controlling the position of the actuator rod 86, including, but not limited to, manually operated devices.

Figure 7:
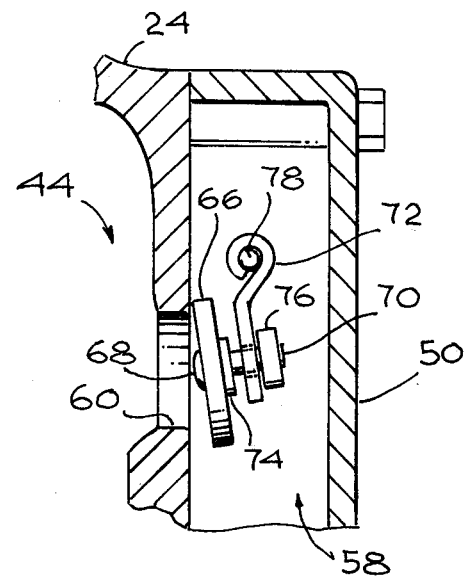
FIG. 7 is an enlarged fragmented vertical section taken on the line 7—7 of FIG. 6, and showing the turbine bypass valve in an open position.

Movement of the actuator rod 86 serves to control opening and closing of the bleed hole 60, as illustrated in FIGS. 6 and 7. As shown, as the actuator rod 86 is shifted in the direction of arrow 96, the crank link 84 is pivoted to rotate the shaft 78 about its own axis in a counterclockwise direction as viewed in FIG. 7. Such rotating movement of the shaft 78 carries the metal strip 72 away from contact with the valve head 66, and thereby allows exhaust gases from the turbine housing gas inlet 44 to blow the valve head 66 away from its seated position on the turbine housing 24 closing the bleed hole 60. In this manner, exhaust gases are allowed to bypass the turbine wheel 22 whereby the turbine wheel is no longer driven at maximum speed to correspondingly reduce compressor boost pressure. The volumetric flow rate of exhaust gases bypassing the turbine wheel is dependent upon the degree of opening of the valve head 66 with respect to the bleed hole 60. Of course, when engine operating conditions dictate that the turbine wheel 12 be rotated at higher speeds, the actuator rod 86 is moved by the regulator 90 to return the valve head 66 to its seated position on the turbine housing 24 to close the bypass bleed hole 60.

A modified embodiment of the turbocharger control of this invention is illustrated in FIG. 8, wherein like components are referred to with like reference numerals. As shown, a turbine housing 24 is provided including an exhaust gas inlet 44 and an exhaust gas outlet 46. Exhaust gases from an internal combustion engine are circulated through the housing 24 to drive a turbine wheel which, in turn, drives a compressor wheel to supply high pressure charge air to the engine. The turbine housing 24 is provided with a bleed hole 60 together with a machined planar end wall 62 surrounding the exhaust gas outlet 46 and the bleed hole 60.

A gas discharge housing 150 is mounted on the end wall 62 of the turbine housing 24 by bolts 54. The housing 150 includes a shell-shaped portion 156 forming a bypass chamber 158 communicating between a discharge passage 148 in the housing 150 and the bleed hole 60. A turbine bypass valve 64 is mounted on the discharge housing 150 and includes a valve head 66 for selectively opening and closing the bleed hole 38. Importantly, the housing 150 is shaped so that the gas discharge passage 148 is angularly formed to angularly position the connecting flange 53 on the housing for suitable connection to an exhaust system conduit for the engine. In this manner, the turbine housing 24 of the turbocharger 10 may be uniformly cast for a wide variety of different engine applications, with the shape of the discharge housing being individually adapted according to the specific engine and exhaust conduit configuration. Moreover, the position of the bleed hole 60 on the turbine housing 24 is uniform for a wide variety of engine applications, and the discharge housing is sized and shaped for use with the same turbine bypass valve 64 and control linkage therefor.

A second modified embodiment of the invention is illustrated in FIG. 9. As shown, a discharge housing 250 is fastened by bolts 54 onto the planar end wall 62 of a turbine housing 24. As before, the turbine housing 24 includes a gas inlet 44 and a gas outlet 46, together with a bleed hole 60 in the end wall 62 opening into the gas inlet 44. The discharge housing 250 includes a discharge passage 248 aligned with the gas outlet 44, and provides an open bypass chamber 258 between the bleed hole 60 and the discharge passage 248. In this embodiment, the discharge housing is shaped so that the discharge passage 248 forms a substantially right angle configuration folding generally over the bleed hole 60 and the bypass chamber 258 for direction communication therewith. Of course, the turbine bypass valve 64 is provided to selectively open and close the bleed hole 60 in response to movement of the actuator rod 86.

The turbocharger control of this invention enables the use of a single turbine housing for a wide variety of engine and exhaust system conduit configurations. The discharge housing is the only component which is individually shaped for an individual application, and said discharge housing includes the turbine bypass valve and the exhaust gas bypass chamber. The bypass valve is a relatively loosely mounted valve which compensates for heat warpage without requiring close manufacturing tolerances, and which seats directly on the turbine housing to close the bypass bleed hole.

Various further modifications and alterations of the invention will be apparent to those skilled in the art. Accordingly, the foregoing description is considered to be exemplary in nature, and not limiting with regard to the scope and spirit of the invention.

What is claimed is:

1. A turbocharger comprising a turbine housing and a compressor housing each having a gas inlet and a gas outlet, said turbine housing having a bleed hole formed therein opening into said gas inlet, said bleed hole and said gas outlet being formed in a common end surface on said turbine housing; a turbine wheel and a compressor wheel disposed within said turbine housing and said compressor housing, respectively, and mounted for simultaneous rotation on a common shaft; a gas discharge housing mounted in operative association with said turbine housing matingly engaging said end surface to extend over the bleed hole and gas outlet, said discharge housing having a gas discharge passage communicating with the gas outlet of said turbine housing, and a bypass chamber communicating between the discharge passage and the bleed hole; and valve means movably mounted on said discharge housing for seating on said turbine housing end surface to selectively close the bleed hole.

2. A turbocharger as set forth in claim 1 wherein said valve means includes a valve head having a cross sectional area larger than the cross sectional area of the bleed hole for seating on the turbine housing end surface to close said bleed hole, and regulator means for selectively moving said valve head for opening and closing said bleed hole.

3. A turbocharger as set forth in claim 1 including regulator means coupled to said valve means for selectively moving said valve means for opening and closing said bleed hole.

4. A turbocharger as set forth in claim 1 wherein said turbine housing end surface comprises a substantially planar end wall having the gas outlet and the bleed hole formed therein.

5. A turbocharger as set forth in claim 1 wherein said discharge housing has a generally shell-shaped configuration opening toward said turbine housing.

6. A turbocharger as set forth in claim 1 wherein the discharge passage formed in said discharge housing is formed to extend from the turbine housing generally toward the bleed hole for communication therewith via the bypass chamber.

7. A turbocharger as set forth in claim 1 wherein said valve means comprises a valve head for seating on the turbine housing to close the bleed hole, a valve stem connected to said valve head and extending generally away from the bleed hole, a shaft movably mounted on said discharge housing, and means for relatively loosely connecting said valve stem to said shaft, said valve head being movable with respect to the bleed hole in response to movement of said shaft.

8. A turbocharger as set forth in claim 7 including regulator means connected to said shaft for selectively moving said shaft with respect to said discharge housing.

9. A turbocharger comprising a turbine housing and a compressor housing each having a gas inlet and a gas outlet, said turbine housing having a substantially planar end wall with said gas outlet and a bleed hole opening into said gas inlet being formed therein; a turbine wheel and a compressor wheel disposed within said turbine housing and said compressor housing, respectively, and mounted for simultaneous rotation on a common shaft; a gas discharge housing mounted in operative association with said turbine housing in mating engagement with said end wall to extend over said bleed hole and gas outlet, said discharge housing having a gas discharge passage communicating with the gas outlet of said turbine housing and a bypass chamber communicating between the discharge passage and the bleed hole; and valve means movable mounted on said discharge housing for seating on said turbine housing end wall to selectively close the bleed hole.

10. A turbocharger as set forth in claim 9 including regulator means coupled to said valve means for selectively moving said valve means for opening and closing said bleed hole.

11. A turbocharger as set forth in claim 9 wherein the discharge passage formed in said discharge housing is formed to extend from the turbine housing generally toward the bleed hole for communication therewith via the bypass chamber.

12. A turbocharger as set forth in claim 9 wherein said valve means comprises a valve head for seating on the turbine housing to close the bleed hole, a valve stem connected to said valve head and extending generally away from the bleed hole, a shaft movably mounted on said discharge housing, and means for relatively loosely connecting said valve stem to said shaft, said valve head being movable with respect to the bleed hole in response to movement of said shaft.

13. A turbocharger comprising a turbine housing and a compressor housing each having a gas inlet and a gas outlet, said turbine housing having a substantially planar end wall with said gas outlet and a bleed hole opening into said gas inlet being formed therein; a turbine wheel and a compressor wheel disposed within said turbine housing and said compressor housing, respectively, and mounted for simultaneous rotation on a common shaft; a generally shell-shaped gas discharge housing including means for mounting said discharge housing on said turbine housing in mating engagement with said end wall extending over said bleed hole and gas outlet, and opening toward said turbine housing, said discharge housing having a gas discharge passage communicating with the gas outlet of said turbine housing, and a bypass chamber communicating between the discharge passage and the bleed hole; a valve head for seating on the turbine housing end wall to selectively open and close the bleed hole; a valve stem connected to said valve head and extending generally away from the bleed hole; a shaft movably mounted on said discharge housing; and means for relatively loosely connecting said valve stem and said shaft, said valve head being movable with respect to the bleed hole in response to movement of said shaft.

14. A turbocharger as set forth in claim 13 wherein the discharge passage formed in said discharge housing is formed to extend from the turbine housing generally toward the bleed hole for communication therewith via the bypass chamber.

15. In a turbocharger having a turbine housing and a compressor housing each having a gas inlet and a gas outlet, and a turbine wheel and a compressor wheel disposed in said turbine housing and said compressor housing, respectively, and mounted for simultaneous rotation on a common shaft, the improvement comprising a substantially planar end wall formed on said turbine housing, said end wall having said gas outlet and a bleed hole opening into said gas inlet formed therein; a discharge housing mounted in operative association with said turbine housing in mating engagement with said end wall extending over said gas outlet and said bleed hole, said discharge housing including a discharge passage communicating with said gas outlet and a bypass chamber communicating between said discharge passage and said bleed hole; and valve means mounted on said discharge housing for seating on said turbine housing end wall for selectively opening and closing said bleed hole.

16. A turbocharger as set forth in claim 15 wherein said valve means comprises a valve head for seating on the turbine housing to close the bleed hole, a valve stem connected to said valve head and extending generally away from the bleed hole, a shaft movably mounted on said discharge housing, and means for relatively loosely connecting said valve stem to said shaft, said valve head being movable with respect to the bleed hole in response to movement of said shaft.

17. A turbocharger as set forth in claim 15 wherein the discharge passage formed in said discharge housing is formed to extend from the turbine housing generally toward the bleed hole for communication therewith via the bypass chamber.

18. A method of controlling the operation of a turbocharger having a turbine housing with an exhaust gas inlet and outlet, and a turbine wheel carried within said housing and driven by exhaust gases circulated through the housing from an internal combustion engine, comprising the steps of providing a bleed hole in the turbine housing opening into the exhaust gas inlet to bypass a portion of the exhaust gases around the turbine wheel; forming a common end surface on the turbine housing including the bleed hole and the gas outlet; mounting an exhaust gas discharge housing on the turbine housing in mating engagement with said end surface extending over the exhaust gas outlet and the bleed hole; forming a chamber in said discharge housing communicating between said exhaust gas outlet and said bleed hole; and movably mounting a valve on the discharge housing for selectively seating on the turbine housing end surface over the bleed hole to close the bleed hole.

19. The method of claim 18 wherein the step of forming said end surface comprises forming a substantially planar end wall on said turbine housing, said exhaust gas outlet and said bleed hole being formed in said end wall.

20. The method of claim 18 including the step of connecting said valve to regulator means for controllably operating said valve in response to predetermined engine operating condition.

* * * * *